United States Patent [19]

Albein et al.

[11] 3,878,854

[45] Apr. 22, 1975

[54] RETENTION CAPACITY OF CIGARETTE FILTERS

[75] Inventors: Klaus Albein, Denzlingen; Dieter Imbery, Mundingen; Hanspeter Oesterle, Waldkirch, all of Germany

[73] Assignee: Deutsche Rhodiaceta AG, Freiburg im Breisgau, Germany

[22] Filed: May 31, 1973

[21] Appl. No.: 365,587

[30] Foreign Application Priority Data

June 5, 1972 Germany............................ 2227291

[52] U.S. Cl. ............................................. 131/266
[51] Int. Cl. .............................................. A24f 7/04
[58] Field of Search..................... 131/266, 267, 109

[56] References Cited
UNITED STATES PATENTS
3,313,306  4/1967  Berger et al. ........................ 131/266

FOREIGN PATENTS OR APPLICATIONS
758,429  10/1956  United Kingdom................ 131/10.9
952,978  1956  Germany ............................ 423/625
897,843  1953  Germany ............................ 423/625

*Primary Examiner*—Robert W. Michell
*Assistant Examiner*—V. A. Millin
*Attorney, Agent, or Firm*—Bucknam and Archer

[57] ABSTRACT

Novel filters for cigarettes with improved retention capacity for nicotine, tars and other substances present in tobacco smoke, are prepared by incorporating into the filters aluminum oxide trihydrate hydrargillite which is more than 80% crystalline, with monoclinicpseudo hexagonal platelet structure.

4 Claims, No Drawings

RETENTION CAPACITY OF CIGARETTE FILTERS

This invention relates to filters for cigarettes and more specifically to filters of superior retention capacity for nicotine, tars and other chemicals present in tobacco smoke.

It has long been known that tars, nicotine and other specific chemical substances present in cigarette smoke can be retained in cigarette filters consisting of crimped fibers of cellulose 2½ acetate.

It has also been alleged that the retention capacity of such filters can be improved by incorporation into the filters adsorbent substances such as mainly activated carbon, but also silicon dioxide of high specific surface, also aluminum oxide and aluminum hydroxide, that is substances likewise of high specific surface. The aluminum hydroxides used have been mainly amorphous material or mixtures of amorphous material and alpha hydroxide (bayerite), but mixtures of amorphous material and diaspore or boehmite or the gamma modification (hydrargillite), have also been used. These mixtures have been classified generally as aluminum hydroxide, although their chemical composition varies between $Al(OH)_3$, or, expressed in another form, the composition may vary from $Al_2O_3 \times 3H_2O$, to $Al_2O_3 \times H_2O$. It has been solely the result of the respective manufacturing process, for instance stirring out in the Bayer process, whether one or another mixture is present. Moreover, no information has ever been given about the crystallinity of these substances, nor has any special significance even been attributed to the crystallinity of alumina. Quite on the contrary, the belief has been that the higher the specific surface, the more favorable must be the retention capacity, because greater amounts of chemicals may be adsorbed on the material incorporated as an additive into the filter on account of the size of the surface. For this reason the above mentioned substances as well as activated carbon, aluminum oxide, silica gel, and also iron oxide of fine-grain structure, have been used as retention improvers.

The crux of the present invention resides in the findings that aluminum hydroxide greatly improves the retention capacity for the components of tobacco smoke, when it comprises more than 80% of crystalline material with monoclinic-pseudohexagonal platelet structure, of specific surface 4 – 15, preferably 5 – 9 $m^2/g$. Although this aluminum hydroxide does not have a specific surface comparable to the other known retention improvers, surprisingly, it exhibits, due to its high proportion of monoclinic-pseudohexagonal crystalline platelets, such a high retention-improving capacity that it would never have been expected on the basis of its specific surface. Surprisingly it has also been found that this material exhibits particularly good retention capacity for acidic as well as basic substances due to its amphoteric character. This was by no means to be expected, because with aluminum oxide adjusted to have neutral properties, the adsorption of acid substances, for example phenol, is considerably inferior, despite the high specific surface. Thus, for example, the neutral $Al_2O_3$, Woelm used for chromatography, exhibits at a specific surface of 78 $m^2/g$ a phenol retention of 71%, while the material used in the present invention, with a specific surface of 6 – 8 $m^2/g$, exhibits a phenol retention of 79%.

As is evident from Table 1, the retention of the aluminum oxide trihydrate hydrargillite used in the present invention for tars, nicotine and phenols, is a function of the specific surface only to a minor extent, but is dependent, to a much greater extent, on the degree of crystallinity.

The data in Table 2 show that the substances with high specific surface are not particularly good adsorbers for tars, nicotine and phenol present in cigarette smoke. This is contrary to the common belief. As is clearly evident from the water adsorption, however, these substances are in themselves, in accordance with their specific surface, good adsorbers in the percolation process of chemical substances, as is generally known from the results of column chromatography with such substances. It is therefore evident, from Table 1 and 2 without doubt, that the crystallinity, namely the monoclinic-pseudohexagonal platelet form, is responsible in major degree for the adsorption capacity of the aluminum oxide trihydrate used in the present invention. T,50

TABLE 2

| Titer of a single fiber: 2.1 denier<br>y=cross section of the single fiber<br>Total titer of the filter tow of crimped fibers of cellulose 2,5 acetate = 42,000 denier | Support Wt. % | Retention % | | | Specific surface of powder in $m^2/g$ (BET meth.) | $H_2O$ adsorption Wt. % of powder |
|---|---|---|---|---|---|---|
| | | Nicotine | Tar | Phenol | | |
| Comparison | 0 | 36 | 37 | 60 | — | — |
| Hydrargillite more than 90% crystalline | 3.8 | 55 | 57 | 79 | 7 | 0.6 |
| $Al_2O_3$ neutral | 3.8 | 45 | 46 | 71 | 78 | 4.6 |
| $Al_2O_3$ acid | 3.8 | 48 | 49 | 72 | 98 | 3.2 |
| $Al_2O_3$ alkaline | 3.8 | 45 | 47 | 71 | 102 | 4.0 |
| $Al_2O_3 \times$ ½ $H_2O$ | 3.8 | 47 | 50 | 74 | 260 | 12.4 |

What is claimed is:

1. A filter for cigarettes which comprises cellulose acetate fibers powdered with aluminum oxide trihydrate hydrargillite of specific surface 4 – 15 $m^2/g$, comprising more than 80% crystalline monoclinic-pseudohexagonal platelets.

2. A filter for cigarettes according to claim 1 which comprises a plug of cellulose 2½ acetate as the support material.

3. The method of adsorbing nicotine, tars and phenol present in the smoke from cigarettes, which comprises providing the cigarettes with filters comprising aluminum oxide trihydrate which is more than 80% crystalline monoclinic-pseudohexagonal platelets.

4. The method according to claim 3 wherein said filter comprises cellulose 2½ acetate as the support.

* * * * *

UNITED STATES PATENT OFFICE
CERTIFICATE OF CORRECTION

Patent No. 3,878,854                         Dated   April 22, 1975

Inventor(s)   Klaus Albien, Denzlinger et al

It is certified that error appears in the above-identified patent and that said Letters Patent are hereby corrected as shown below:

1. The name of the first inventor is:

Klaus Albien. This name has been incorrectly spelled in two instances, at page 1, left column, line 2 and line 5.

3. Table 1, which is page 5 of the application, has been omitted. A copy of Table 1 is attached hereto.

Signed and Sealed this twenty-third Day of September 1975

[SEAL]

Attest:

RUTH C. MASON
Attesting Officer

C. MARSHALL DANN
Commissioner of Patents and Trademarks

TABLE 1

Titer of a single fiber: 2.1 denier
Y-cross section of the single fiber
Total titer of the filter tow of crimped fibers of cellulose 2,5 acetate = 42,000 denier

| | Support wt. % | Retention % Nicotine | Retention % Tar Phenol | Specific surface of powder in m²/g (BET meth.) |
|---|---|---|---|---|
| Comparison | 0 | 35 | 37 60 | |
| Hydrophilic more than 90% crystalized | 3.0 | 55 | 57 79 | 7 |
| Al(OH)₃ amorphous | 3.6 | 47 | 69 72 | 29 |

[SEAL]

Attest:

RUTH C. MASON
*Attesting Officer*

Signed and Sealed this
twenty-third Day of September 1975

C. MARSHALL DANN
*Commissioner of Patents and Trademarks*